United States Patent
Durocher

(10) Patent No.: US 6,884,991 B2
(45) Date of Patent: Apr. 26, 2005

(54) STEERING WHEEL ANGLE SENSOR

(75) Inventor: Daniel J. Durocher, Leonard, MI (US)

(73) Assignee: TRW Inc., Lyndhurst, OH (US)

( * ) Notice: Subject to any disclaimer, the term of this patent is extended or adjusted under 35 U.S.C. 154(b) by 232 days.

(21) Appl. No.: 10/238,529

(22) Filed: Sep. 10, 2002

(65) Prior Publication Data

US 2004/0046112 A1 Mar. 11, 2004

(51) Int. Cl.$^7$ .................................................. G01D 5/34
(52) U.S. Cl. .............................. 250/231.13; 250/231.18
(58) Field of Search .......................... 250/231.13, 231.14, 250/231.15, 231.16, 231.18; 341/11, 13; 701/41, 36; 702/151, 150; 180/9.3, 9.38, 9.44

(56) References Cited

U.S. PATENT DOCUMENTS

| | | | |
|---|---|---|---|
| 4,683,375 A | 7/1987 | Hoshino et al. | |
| 4,821,016 A | 4/1989 | Zeller et al. | |
| 5,880,367 A | 3/1999 | Vaughn | |
| 5,900,930 A | 5/1999 | Simon et al. | |
| 6,298,565 B1 | 10/2001 | Weber et al. | |
| 6,555,808 B1 * | 4/2003 | Takeuchi et al. | 250/231.13 |
| 2002/0020070 A1 | 2/2002 | Takeuchi | |

FOREIGN PATENT DOCUMENTS

| | | |
|---|---|---|
| DE | 4243778 | 6/1994 |
| DE | 0704344 | 12/1999 |
| EP | 0913319 | 6/1999 |
| EP | 1108976 | 6/2001 |
| FR | 2800347 | 5/2001 |
| WO | 9726173 | 7/1997 |
| WO | 01/42753 | 6/2001 |

* cited by examiner

Primary Examiner—Que T. Le
(74) Attorney, Agent, or Firm—Tarolli, Sundheim, Covell & Tummino L.L.P.

(57) ABSTRACT

Apparatus (10) includes a first data ring (72) rotatable with a member (24) and includes bit indicators (76) for indicating an absolute angular position of the member. Sensors (100, 102) read the bit indicators (76) of the first data ring (72) and provide a first signal indicative of the absolute angular position of the member (24). A second data ring (74) is rotatable with the member (24) and includes bit indicators (76) for indicating incremental changes in the angular position of the member. Sensors (104, 106) read the bit indicators (76) of the second data ring (74) and provide a second signal, having about twice the resolution of the first signal, indicative of incremental changes in angular position of the member (24). A processor (200) receives the first and second signals and calculates an absolute angular position of the member (24) having a resolution equal to the second resolution.

39 Claims, 7 Drawing Sheets

FOURTH PAIR 90° AHEAD OF THIRD PAIR

| CURRENT POSITION | | NEXT POSITION | | | |
|---|---|---|---|---|---|
| | | COUNTERCLOCKWISE | | CLOCKWISE | |
| 3rd PAIR | 4th PAIR | 3rd PAIR | 4th PAIR | 3rd PAIR | 4th PAIR |
| 0 | 0 | 0 | 1 | 1 | 0 |
| 0 | 1 | 1 | 1 | 0 | 0 |
| 1 | 0 | 0 | 0 | 1 | 1 |
| 1 | 1 | 1 | 0 | 0 | 1 |

THIRD PAIR 90° AHEAD OF FOURTH PAIR

| CURRENT POSITION | | NEXT POSITION | | | |
|---|---|---|---|---|---|
| | | COUNTERCLOCKWISE | | CLOCKWISE | |
| 3rd PAIR | 4th PAIR | 3rd PAIR | 4th PAIR | 3rd PAIR | 4th PAIR |
| 0 | 0 | 1 | 0 | 0 | 1 |
| 0 | 1 | 0 | 0 | 1 | 1 |
| 1 | 0 | 1 | 1 | 0 | 0 |
| 1 | 1 | 0 | 1 | 1 | 0 |

STEERING WHEEL ANGLE SENSOR

FIELD OF THE INVENTION

The present invention relates to a vehicle steering wheel angle sensor. More particularly, the present invention relates to a vehicle steering angle sensor with a steering wheel turns counter.

BACKGROUND OF THE INVENTION

Apparatuses for determining the steering angle of a vehicle are known. Apparatuses for counting the number of turns of a vehicle steering wheel are also known. Such known apparatuses provide steering angle and steering wheel turns data to vehicle systems such as vehicle safety systems and active suspension systems. In providing such data, it is desirable to determine the steering wheel angle with a high degree of resolution.

SUMMARY OF THE INVENTION

An apparatus comprises a first data ring rotatable about an axis with a member. The first data ring includes binary bit indicators for indicating an absolute angular position of the member. The apparatus further comprises sensors that read the binary bit indicators of the first data ring and provide a first signal indicative of the absolute angular position of the member. The first signal has a first resolution capable of detecting a first predetermined amount of change in the angular position of the member.

The apparatus also comprises a second data ring rotatable about the axis with the member. The second data ring includes binary bit indicators for indicating incremental changes in the angular position of the member. The apparatus further comprises sensors that read the binary bit indicators of the second data ring and provide a second signal indicative of incremental changes in angular position of the member. The second signal has a second resolution capable of detecting a second predetermined amount of change in the angular position of the member, about half of the first predetermined amount. The apparatus also comprises a processor that receives the first and second signals and calculates an absolute angular position of the member having a resolution equal to said second resolution.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF THE PREFERRED EMBODIMENTS

Figure 1:
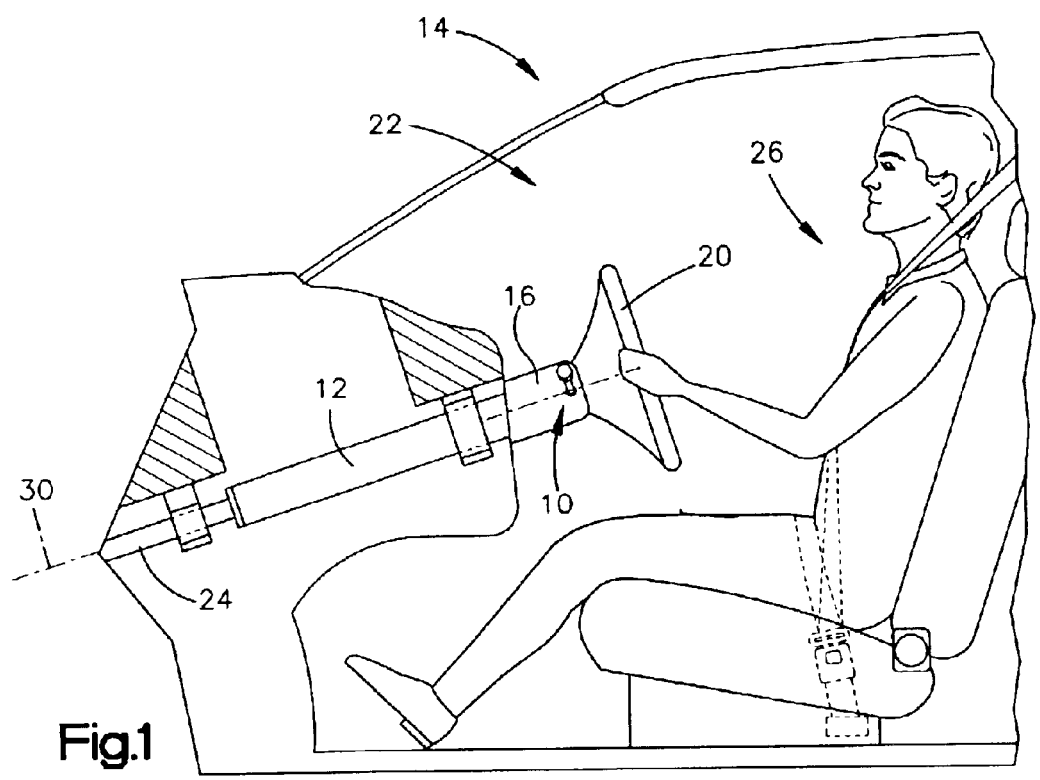
FIG. 1 is a schematic view of a module including a steering wheel angle sensor mounted in a vehicle in accordance with the present invention.

As representative of the present invention, FIG. 1 illustrates a module 10 mounted on a steering column 12 of a vehicle 14. The module 10 may be enclosed in a housing 16 mounted to the steering column 12. A steering wheel 20, located in an occupant compartment 22 of the vehicle 14, is connected to a steering shaft 24 that extends through the steering column 12. A vehicle occupant 26 may rotate the steering wheel 20 and steering shaft 24 about a steering axis 30 to effect steering movement of the vehicle 14 in a known manner.

Figure 2:
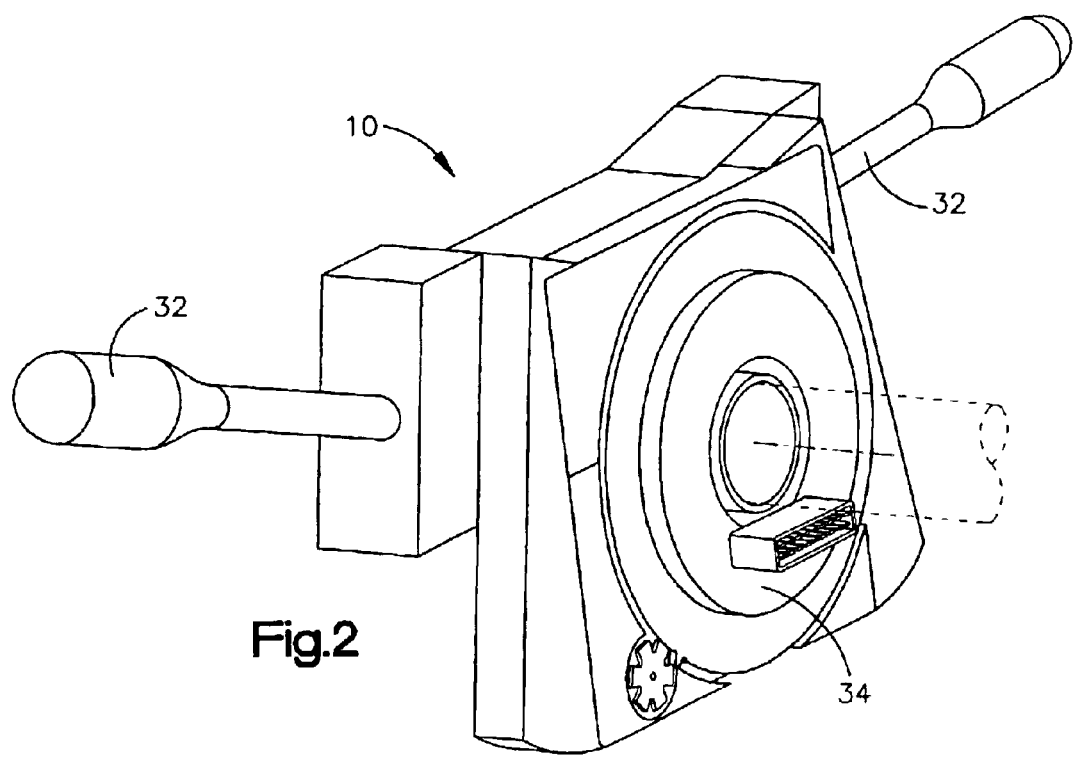
FIG. 2 is a perspective view of the module of FIG. 1.

As illustrated in FIG. 2, the module 10 may include switch assemblies 32 that are actuatable to activate or deactivate vehicle devices (not shown) such as directional indicators, headlights, windshield wipers, etc. The module 10 may also include a rotary connector 34 for providing an electrical connection to electrical components mounted on the vehicle steering wheel (not shown in FIG. 2). For example, the rotary connector 34 may provide an electrical connection to initiation circuitry for a steering wheel mounted air bag. As a further example, the rotary connector 34 could also provide an electrical connection to a vehicle horn or switches for controlling devices such as a vehicle sound system, cruise control, climate control, communications equipment, etc.

In the illustrated embodiment, the switch assemblies 32 and the rotary connector 34 each are individual assemblies. The switch assemblies 32 are mounted or otherwise connected to the rotary connector 34. The module 10 thus comprises the assemblage of the switch assemblies 32 and the rotary connector 34. Those skilled in the art, however, will recognize that the switch assemblies 32 and the rotary connector 34 could be constructed as a single assembly. Those skilled in the art will also recognize that the switches 32 could be separate from the assembly and could be connected directly to the steering column or housing (not shown in FIG. 2).

Figure 3:
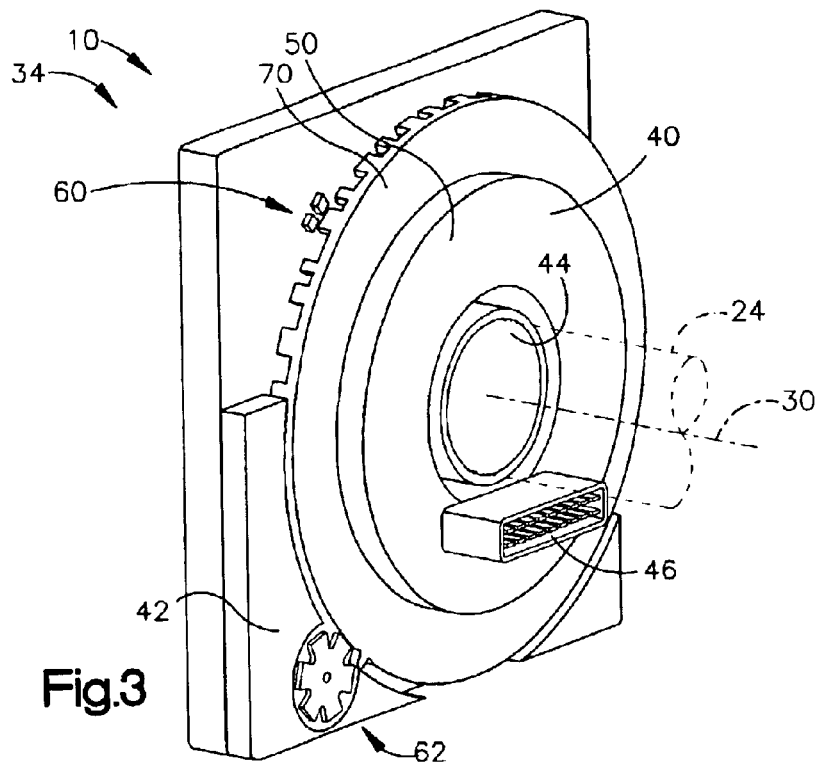
FIG. 3 is a perspective view of a portion of the module of FIG. 2.

Referring to FIG. 3, the rotary connector 34 includes a rotor 40 that is rotatable relative to a base 42 of the rotary connector. The rotor 40 includes a generally cylindrical sleeve 44 that is adapted to slide over and connect to the steering shaft 24. The rotor 40 is thus rotatable with the steering shaft 24, and thus the steering wheel, about the axis 30. Those skilled in the art will appreciate that, alternatively, the rotor 40 could be adapted to connect directly to the steering wheel or any other suitable part that is rotatable with the steering wheel. The rotor 40 also includes an electrical connector 46 and a cylindrical housing 50 for supporting a ribbon cable portion (not shown) of the rotary connector 34.

As a feature of the present invention, the module 10 includes a steering wheel angle sensor 60 and a steering wheel turns counter 62. Preferably, the angle sensor 60 and the turns counter 62 are incorporated into the rotary connector 34. Those skilled in the art, however, will recognize that the angle sensor 60 and the turns counter 62 could be separate parts for assembly with the module 10.

Figure 4:
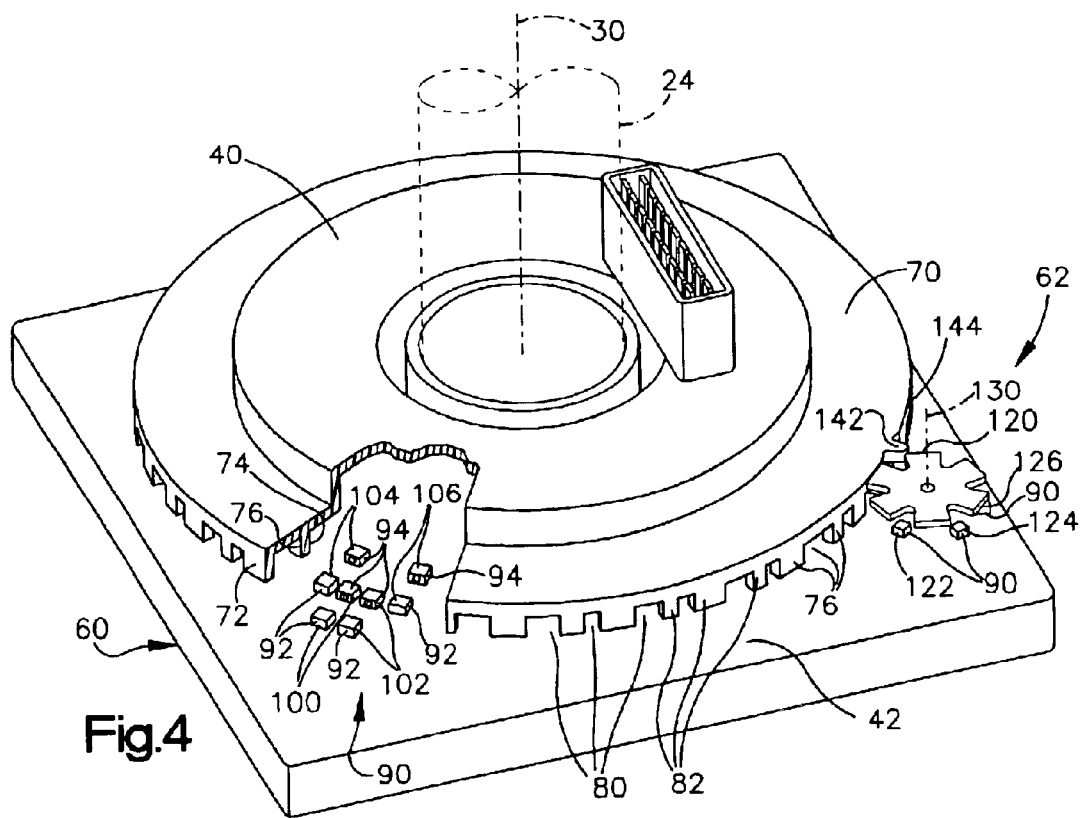
FIG. 4 is a perspective view of the portion of the module of FIG. 3 including a cutaway portion.

Referring to FIG. 4, the rotor 40 includes a data wheel 70 that forms a part of the angle sensor 60. The data wheel 70 is centered on the axis 30 and rotatable with the steering shaft 24 about the axis. The data wheel 70 includes concentric first and second data rings 72 and 74, each of which include a plurality of binary bit indicators 76 positioned in respective annular patterns about the axis 30. The binary bit indicators 76 in the first and second data rings comprise apertures 80 and interrupters 82. The apertures 80 extend through the data wheel 70 and the interrupters 82 comprise generally opaque portions of the data wheel. In the illustrated embodiment, the interrupters 82 comprise generally opaque portions of the data wheel and the apertures 80 comprise spaces between the interrupters.

The angle sensor 60 also comprises means for reading the first and second data rings 72 and 74 in the form of optical sensors pairs 90. Each of the optical sensor pairs 90 includes an optical transmitter 92 and an optical receiver 94 that are positioned opposite each other and facing each other. The transmitter 92 of each optical sensor pair 90 is operable to transmit a light signal to the respective receiver 94 of the pair. The receiver 94 is actuatable from an unactuated condition when the light signal from the respective transmitter 92 is not detected to an actuated condition when the light signal is detected.

The angle sensor 60 of the illustrated embodiment includes first and second optical sensor pairs 100 and 102 that read the first data ring 72, and third and fourth optical sensor pairs 104 and 106 that read the second data ring 74. The transmitters 92 and receivers 94 of the first and second optical sensor pairs 100 and 102 are positioned on opposite sides of the first data ring 72. The binary bit indicators 76, i.e., apertures 80 and interrupters 82, of the first data ring 72 pass between the transmitters 92 and receivers 94 of the first and second optical sensor pairs 100 and 102 as the data wheel rotates about the axis 30. The apertures 80 permit the light transmitted by the transmitters 92 of the first and second optical sensor pairs 100 and 102 to reach the respective receivers 94 of the pairs. The interrupters 82 block the light transmitted by the transmitters 92 of the first and second optical sensor pairs 100 and 102 from reaching the respective receivers 94 of the pairs.

The transmitters 92 and receivers 94 of the third and fourth optical sensor pairs 104 and 106 are positioned on opposite sides of the second data ring 74. The binary bit indicators 76, i.e., apertures 80 and interrupters 82, of the second data ring 74 pass between the transmitters 92 and receivers 94 of the third and fourth optical sensor pairs 104 and 106 as the data wheel rotates about the axis 30. The apertures 80 permit the light transmitted by the transmitters 92 of the third and fourth optical sensor pairs 104 and 106 to reach the respective receivers 94 of the pairs. The interrupters 82 block the light transmitted by the transmitters 92 of the third and fourth optical sensor pairs 104 and 106 from reaching the respective receivers 94 of the pairs.

Figure 5:
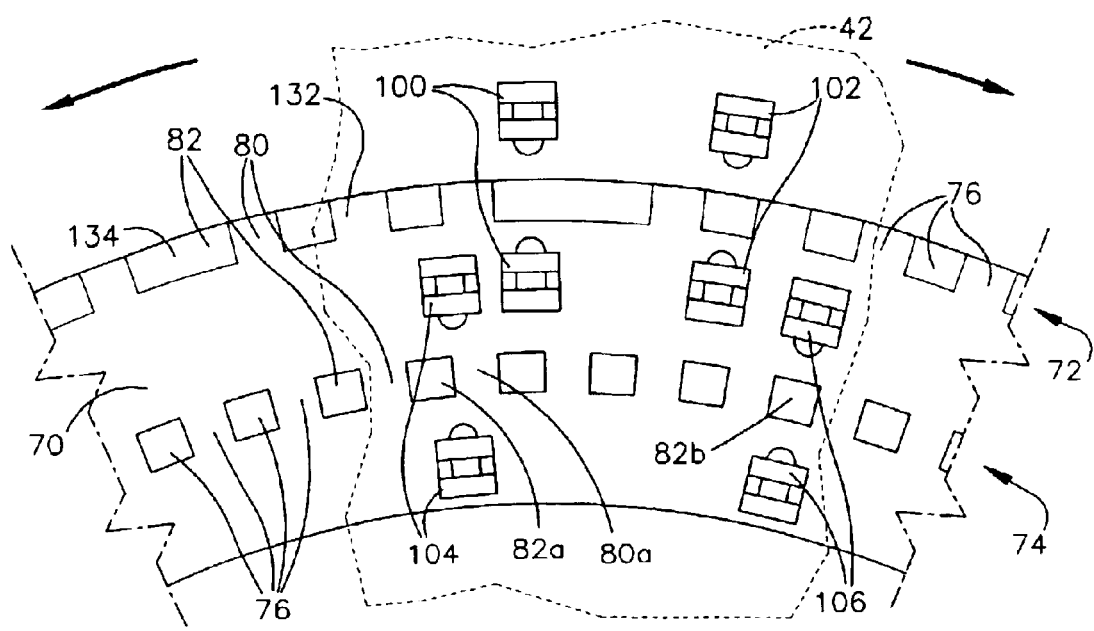
FIG. 5 is a schematic illustration of a portion of a steering wheel angle sensor portion of the module.

Referring to FIG. 5, the binary bit indicators 76 of the first data ring 72 each are equal in size and are spaced in a predetermined pattern along the first data ring. By "equal in size", it is meant that each of the apertures 80 and interrupters 82 of the first data ring 72 occupy an equal angular portion of the first data ring. The predetermined pattern of the binary bit indicators 76 may position more than one aperture 80 or interrupter 82 directly adjacent to each other. For example, a single aperture 80 is positioned at the location labeled 132, whereas two interrupters 82 are located directly adjacent to each other at the location labeled 134.

The binary bit indicators 76 of the second data ring 74 each are equal in size and are spaced in an alternating pattern along the first data ring. By "equal in size", it is meant that the apertures 80 and interrupters 82 of the second data ring 74 each occupy an equal angular portion of the second data ring. By "alternating pattern", it is meant that the apertures 80 and interrupters 82 are positioned in an alternating order such that no two apertures are positioned directly adjacent to each other and no two interrupters are positioned directly adjacent to each other.

Preferably, each one of the binary bit indicators 76 in both the first and second data rings 72 and 74 occupies an equal angular portion of the first and second data rings, respectively. Thus, preferably, the first and second data rings 72 and 74 each include an equal number of binary bit indicators 76, half of which comprise apertures 80 and half of which comprise interrupters 82. In a preferred construction of the angle sensor 60, the first and second data rings 72 and 74 each include 256 (two hundred and fifty-six) binary bit indicators 76. The binary bit indicators 76 comprise 128 (one hundred and twenty-eight) apertures 80 and 128 (one hundred and twenty-eight) interrupters 82. Thus, in the preferred construction, each of the binary bit indicators 76 in the first and second data rings 72 and 74 occupies an angular portion equal to 360/256 degrees, or about 1.40625 degrees.

The first and second optical sensor pairs 100 and 102 are preferably spaced four bits apart along the first data ring 72. By "four bits apart", it is meant that when one binary bit indicator 76 of the first data ring 72 is positioned between the first optical sensor pair 100, another binary bit indicator spaced four bits away on the first data ring is positioned between the second optical sensor pair 102. Put another way, the first and second optical sensor pairs 100 and 102 are spaced such that there are three binary bit indicators 76 between the respective binary bit indicators bits positioned between the first and second optical sensor pairs. This is illustrated in FIG. 5.

The third and fourth optical sensor pairs 104 and 106 are arranged to read the binary bit indicators 76 of the second data ring 74 in quadrature. By "quadrature," it is meant that the third and fourth optical sensor pairs 104 and 106 are positioned along the second data ring 74 such that one of the pairs reads an edge transition between adjacent binary bit indicators 76 when the other of the pairs reads the middle of a binary bit indicator. For example, in the embodiment illustrated in FIG. 5, the third optical sensor pair 104 is reading an edge transition between an aperture 80a and an interrupter 82a while the fourth optical sensor pair 106 is reading the middle of an interrupter 82b.

The first and second optical sensor pairs 100 and 102 are positioned to read the middle of the respective binary bit indicators 76 positioned between the first and second pairs when either the third optical sensor pair 104 or the fourth optical sensor pair 106 reads the edge transition of adjacent binary bit indicators. In the embodiment illustrated in FIG. 5, the first and second optical sensor pairs 100 and 102 read the middle of the respective binary bit indicators 76 positioned between the pairs when the third optical sensor pair 104 reads the edge transition of adjacent binary bit indicators. The fourth optical sensor pair 106 reads the middle of a respective binary bit indicator 76 when the first and second optical sensor pairs 100 and 102 read the middle of respective binary bit indicators.

As the data wheel 70 rotates about the axis 30, the first and second data rings 72 and 74 pass between the first and second optical sensor pairs 100 and 102 and the third and fourth optical sensor pairs 104 and 106, respectively. As this occurs, the binary bit indicators 76 place the optical sensor pairs 100, 102, 104, 106 in the actuated or non-actuated condition. When an aperture 80 is positioned between any of the optical sensor pairs 100, 102, 104, 106 of the angle sensor 60, the respective pair is placed in the actuated condition. When an interrupter 82 is positioned between any of the optical sensor pairs 100, 102, 104, 106 of the angle sensor 60, the respective pair is placed in the non-actuated condition.

Figure 6:
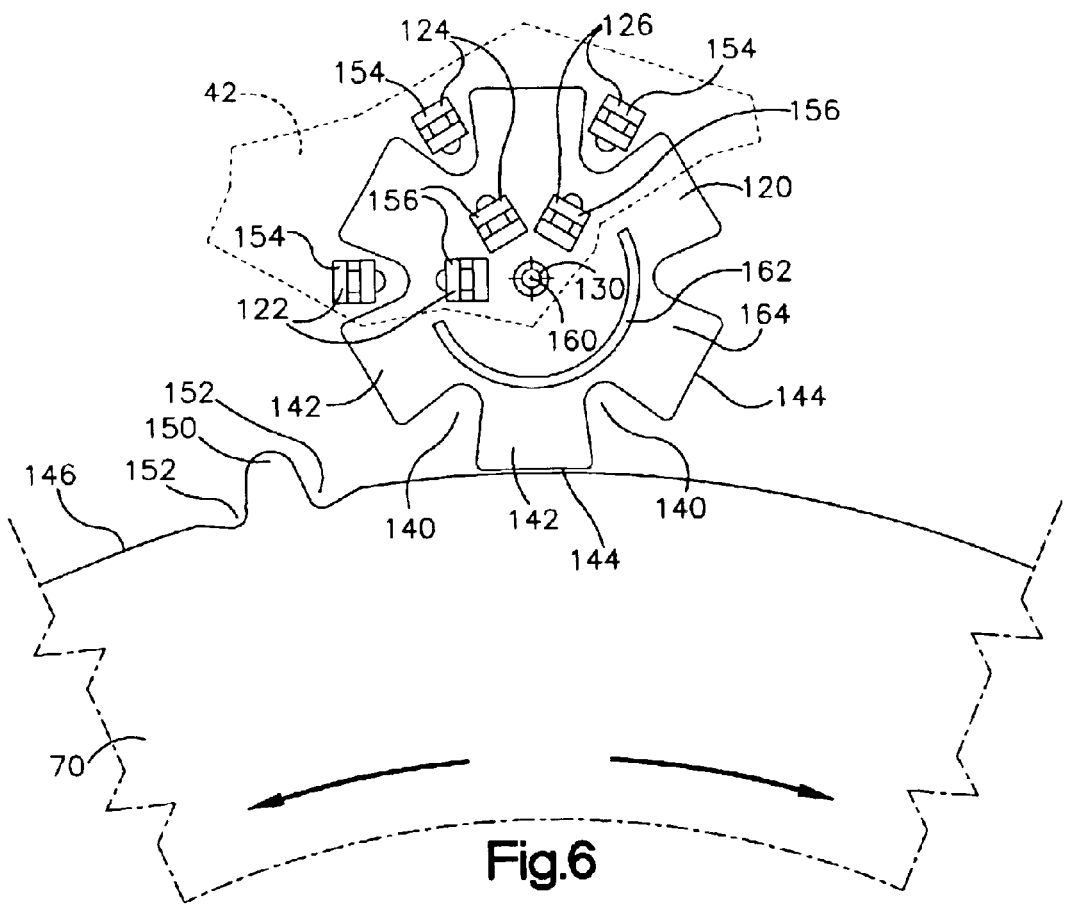
FIG. 6 is a schematic illustration of a turns counter portion of the module.

Referring to FIGS. 4 and 6, the turns counter 62 comprises a counter wheel 120 and first, second and third optical sensor pairs indicated at 122, 124, and 126, respectively. The counter wheel 120 is connected to the base 42, adjacent the data wheel 70, and is rotatable about an axis 130. The axis 130 is offset from, and extends parallel to, the axis 30 (FIG. 4). The counter wheel 120 (FIGS. 4 and 6) includes a plurality of notches 140 spaced equidistantly along the periphery of the counter wheel. The notches 140 help define generally leaf-shaped petals 142 of the counter wheel 120.

The petals 142 (FIG. 6) each have a generally arc-shaped, concave outer edge 144 having a radius about equal to the radius of an outer edge 146 of the data wheel 70. The counter wheel 120 is positioned such that the outer edge 144 of one of the petals 142 is spaced close to the outer edge 146 of the data wheel 70. The outer edge 144 is positioned close enough to the outer edge 146 such that the counter wheel 120 is blocked from rotating about the axis 130 by the data wheel 70.

The data wheel 70 includes a tooth 150 that extends radially from the edge 146 of the data wheel 70. The data wheel 70 also includes indentations 152 that extend inward of the outer surface 146 on opposite sides of the tooth 150. The counter wheel 120 is positioned such that one of the notches 140 is located in the arcuate path along which the tooth 150 travels as the data wheel rotates about the axis 30. The notches 140 are sized and positioned so as to receive the tooth 150 as the data wheel 70 is rotated about the axis 30.

The first, second and third optical sensor pairs 122, 124, and 126 each include an optical transmitter 154 and an optical receiver 156 that are positioned opposite each other and facing each other. The transmitter 154 of each pair is operable to transmit a light signal to the respective receiver 156 of the pair. The receiver 156 is actuatable from an unactuated condition when the light signal from the respective transmitter 154 is not detected to an actuated condition when the light signal is detected.

In the embodiment illustrated in FIG. 6, the counter wheel 120 includes six notches 140 spaced evenly about the wheel. The notches 140 are thus centered sixty degrees apart about the counter wheel 120. Preferably, the first and second optical pairs 122 and 124 are spaced about sixty degrees apart and the third optical sensor pair 126 is spaced about sixty degrees from the second optical pair. The first and third optical sensor pairs 122 and 126 are thus spaced about 120 degrees apart.

The counter wheel 120 includes a counter interrupter 162 that extends from a lower surface 164 of the counter wheel. As illustrated in FIG. 6, the interrupter 162 is generally arc-shaped and is rotatable with the counter wheel 120. The length of the interrupter 162 is sufficient to be positioned simultaneously between the transmitters 154 and receivers 156 of all three of the first, second, and third optical sensor pairs 122, 124, and 126. The interrupter 162 therefore extends at least about 120 (one hundred and twenty) degrees about the axis 130.

The data wheel 70 is rotatable in opposite rotational directions illustrated by the arrows in FIG. 6. As the data wheel 70 rotates, the tooth 150 approaches the counter wheel 120. As the tooth 150 moves along an arcuate path towards the counter wheel 120, the tooth will engage one of the notches 140. Continued movement of the tooth 150 along the arcuate path causes the counter wheel 120 to rotate about the axis 130. The indentations 152 provide a clearance between the outer surfaces 144 and 146, thus permitting the data wheel 70 to impart rotation of the counter wheel 120 as the tooth 150 passes by the notch 140. Once the counter wheel 120 has rotated about sixty degrees, the notch 140 becomes positioned such that the tooth 150 disengages and exits the notch. Once the tooth 150 exits the notch 140, the counter wheel 120 is again blocked from rotation by the data wheel 70 in the manner stated above.

The counter wheel 120 (FIG. 6) is thus indexed about sixty degrees each time the tooth 150 passes the counter wheel 120. If the data wheel 70 rotates in a clockwise direction as viewed in FIG. 6, the counter wheel is indexed in a counterclockwise direction as viewed in FIG. 6. If the data wheel 70 rotates in a counterclockwise direction as viewed in FIG. 6, the counter wheel is indexed in a clockwise direction as viewed in FIG. 6.

The data wheel and the counter wheel 120 are illustrated in a zero turns position in FIG. 6. By "zero turns position", it is meant that the counter wheel 120 is in the position wherein the steering wheel (not shown in FIG. 6) has not made a complete revolution, such as when the vehicle is being steered in a straight direction. In the illustrated embodiment, when the data wheel 70 is in the zero turns position, the tooth 150 is positioned radially opposite the notch 140 in the counter wheel 120. The data wheel 70 thus must be rotated 180° in order for the tooth 150 to reach the notch 140. Those skilled in the art, however, will recognize that the position of the tooth 150 in the zero turns position is arbitrary and thus may be selected at any desired position. For example, the zero turns position could be defined as the position illustrated in FIG. 6.

In the zero turns position, the counter interrupter 162 is not positioned between any of the first, second or third optical sensor pairs 122, 124, 126. Opposite ends of the counter interrupter 162 are positioned about thirty degrees from the first and third optical sensor pairs 122 and 126, respectively. The opposite ends of the counter interrupter 162 could, however, be positioned closer to or farther away from the first and third optical sensor pairs 122 and 126.

As the data wheel 70 rotates about the axis (not shown in FIG. 6), the tooth 150 will engage a notch 140 and begin to rotate the counter wheel 120 in the manner set forth above. When the counter wheel 120 rotates a given distance, a respective end of the counter interrupter 162 will interrupt either the first optical sensor pair 122 or third optical sensor pair 126, depending upon the direction of rotation of the counter wheel 120.

Figure 7A:
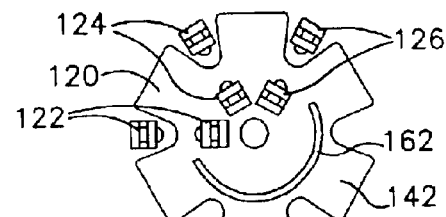
FIGS. 7a–7c are schematic illustrations depicting different positions of the turns counter portion of FIG. 6.
Figure 7B:
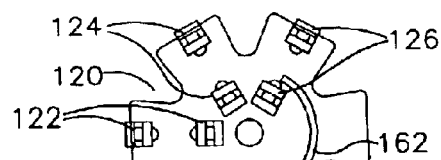
Figure 7C:
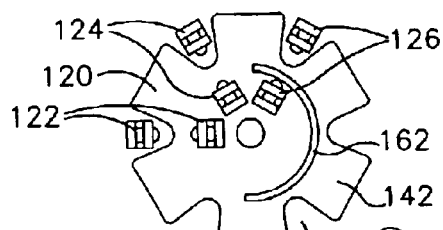

As an example of the operation of the turns counter 62 as described above, the interaction between the data wheel 70 and the counter wheel 120 is illustrated in FIGS. 7a–7c. When the data wheel 70 rotates in either direction, the tooth 150 approaches the notch 140. As viewed in FIGS. 7a–7c, the data wheel 70 is illustrated as rotating in a clockwise direction. The clockwise direction is indicated generally by the arrows in FIGS. 7a–7c. As the data wheel 70 continues to rotate from the position of FIG. 7a to the positions of FIGS. 7b and 7c, the counter interrupter 162 moves between the third optical sensor pair 126. This indicates that the data wheel 70 and, thus, the steering wheel has rotated 180 degrees, or one-half turn, in the clockwise direction from the zero turns position.

If the data wheel 70 makes another complete revolution in the clockwise direction, the counter wheel 120 will again be indexed in the counterclockwise direction and the counter interrupter 162 will be positioned between the third and second optical sensor pairs 126 and 124, respectively. This indicates that the data wheel 70 and, thus, the steering wheel has rotated 540 degrees, or one and one-half turns, in the clockwise direction from the zero turns position. If the data wheel 70 makes yet another complete revolution in the clockwise direction, the counter wheel 120 will again be indexed in the counterclockwise direction and the counter interrupter 162 will be positioned between the third, second and first optical sensor pairs 126, 124 and 122, respectively. This indicates that the data wheel 70 and, thus, the steering wheel has rotated 900 degrees, or two and one-half turns, in the clockwise direction from the zero turns position.

If, from the zero turns position, the data wheel 70 rotates in the counterclockwise direction, the counter wheel 120 will index in the clockwise direction. The counter interrupter 162 would thus become positioned between the first optical sensor pair 122 as the data wheel 70 when the tooth 150 indexes the counter wheel 120. This indicates that the data wheel 70 and, thus, the steering wheel has rotated 180 degrees, or one-half turn, in the counterclockwise direction from the zero turns position. As the data wheel 70 makes a complete revolution in the counterclockwise direction, the counter wheel 120 would again be indexed in the clockwise direction and the counter interrupter 162 will be positioned between the first and second optical sensor pairs 122 and 124, respectively. This indicates that the data wheel 70 and, thus, the steering wheel has rotated 540 degrees, or two and one-half turns, in the counterclockwise direction from the zero turns position. If the data wheel 70 makes yet another complete revolution in the counterclockwise direction, the counter wheel 120 will again be indexed in the clockwise direction and the counter interrupter 162 will be positioned between the first, second and third optical sensor pairs 122, 124 and 126, respectively. This indicates that the data wheel 70 and, thus, the steering wheel has rotated 900 degrees, or two and one-half turns, in the counterclockwise direction from the zero turns position.

In accordance with the above, as the data wheel 70 rotates, the counter interrupter 162 will be indexed between the first, second and third optical sensor pairs 122, 124 and 126 in a variety of combinations. When the counter interrupter 162 is positioned between any one of the optical sensor pairs 122, 124, 126 of the turns counter 62, that respective pair is placed in the non-actuated condition. When the counter interrupter 162 is not positioned between an optical sensor pair 122, 124, 126 of the turns counter 62, that respective pair is placed in the actuated condition. Thus, it will be appreciated that the first, second and third optical sensor pairs 122, 124 and 126 provide an indication of the number of complete turns made by the data wheel 70 and, thus, the steering wheel.

Figure 8:
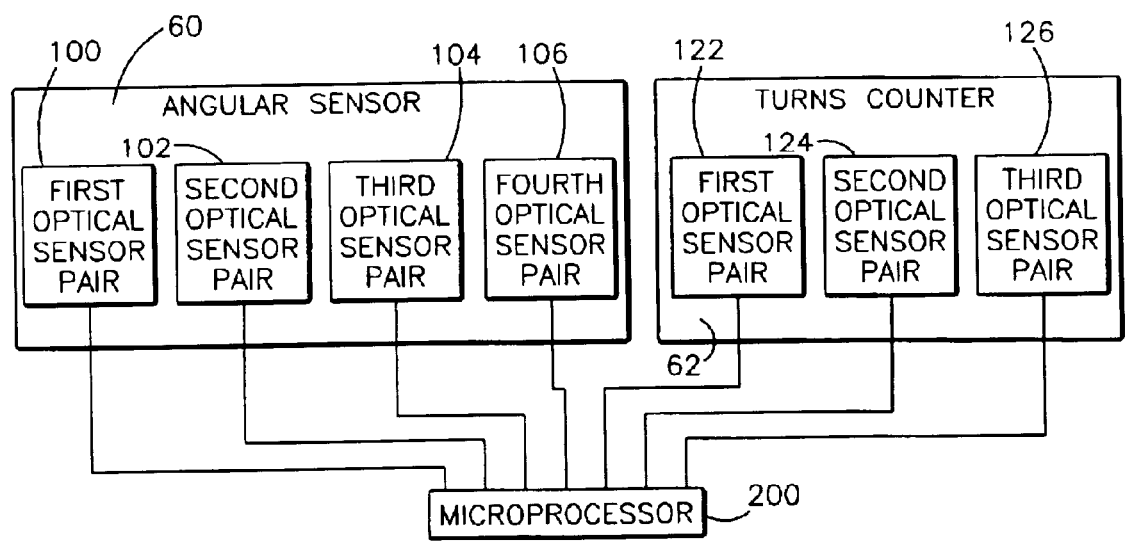
FIG. 8 is a block diagram illustrating the configuration of a system for using the module

As illustrated in FIG. 8, the apparatus 10 includes means, such as a microprocessor 200, for interrogating the optical sensor pairs 100, 102, 104, and 106 of the angle sensor 60 and the optical sensor pairs 122, 124, and 126 of the turns counter 62 in order to determine the steering angle of the steering wheel. Upon interrogation of the optical sensor pairs, the microprocessor 200 receives a signal from each of the pairs that indicates whether light signals are received by the respective receivers of the pairs.

Upon interrogation of the optical sensor pairs of the angle sensor 60 and the turns counter 62, if the respective receiver detects a light signal, the microprocessor 200 reads an actuated or "on" condition of the optical sensor pair. The microprocessor 200 associates a digital value of "1", representative of the actuated condition of the optical sensor pair. If the respective receiver 94 does not detect a light signal, the microprocessor 200 reads an non-actuated or "off" condition of the optical sensor pair 90. The microprocessor 200 associates a digital value of "0" is associated with the actuated condition of the optical sensor pair. Those skilled in the art will recognize that the digital value assigned to the condition of the optical sensor pairs 90 is arbitrary and the values could be reversed. Thus, the actuated condition could be associated with a digital value of "0" and the non-actuated condition could be associated with a digital value of "1".

The digital bit indicators 76 of the first data ring 72 are arranged in a pseudo-random bit sequence such that any eight adjacent digital bit indicators form a unique eight bit word associated with the predetermined angular portion occupied by the least significant bit of the eight bit word. There are thus two-hundred and fifty-six (256) unique eight bit words in the pseudo-random bit sequence.

Figure 9:
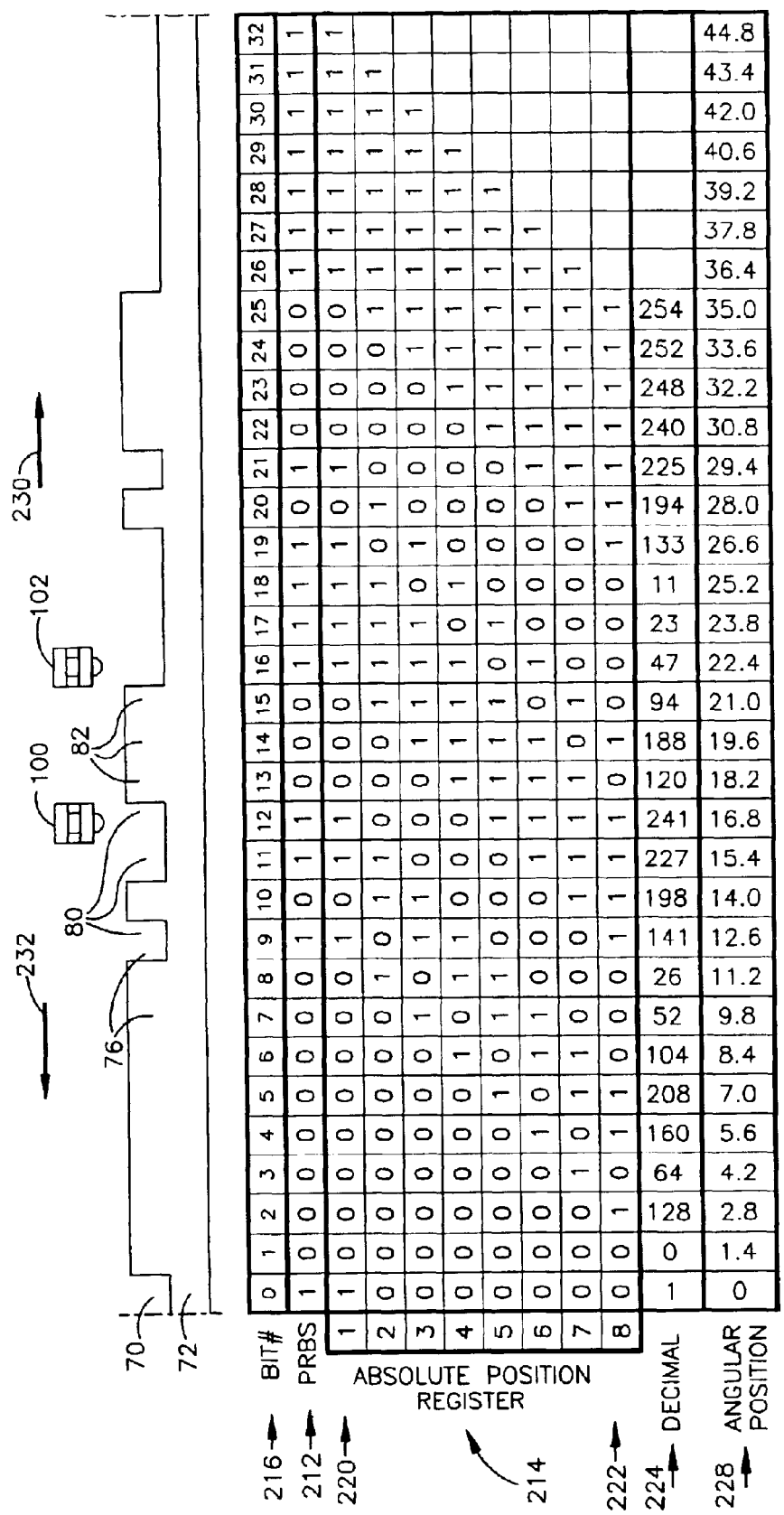
FIG. 9 is a table including a schematic illustration depicting the operation of the angle sensor portion of the module.

A portion of the data wheel 70, including a portion of the first data ring 72, and the first and second optical sensor pairs 100 and 102 are illustrated in FIG. 9. The table 210 positioned below the data wheel 70 illustrates the pseudo random bit sequence (PRBS) at 212 and an absolute position register at 214. The absolute position register 214 is created by the microprocessor (not shown in FIG. 9) and stored in memory. The absolute position register 214 indicates the unique eight bit word of the pseudo-random bit sequence 212 represented by each of the binary bit indicators 76. The least significant bits represented by each of the binary bit indicators 76 is indicated by the bit of the pseudo-random bit sequence 212 positioned below each respective binary bit indicator. The bits are labeled in the table 210 by bit number at 216 for reference purposes.

As stated above, in the illustrated embodiment, the third optical sensor pair 104 reads an edge transition between binary bit indicators 76 when the first and second optical sensor pairs 100 and 102 read the midpoint of respective binary bit indicators. The third optical sensor pair 104 thus acts as a trigger for reading the first and second optical sensor pairs 100 and 102. Each time the third optical sensor pair 104 reads an edge transition, the first and second optical sensor pairs 100 and 102 are interrogated, i.e., bits of the pseudo random bit sequence 212 (FIG. 9) are read, in order to determine the eight bit word of the absolute position register 214.

The eight bit word in the register 214 is read by the first and second optical sensor pairs 100 and 102 of the angle sensor 60 and placed in the absolute position register 214. The first optical sensor pair 100 reads the first four bits of the eight bit word 210, i.e., the least significant bit (row 1 of the absolute position register 214), indicated at 220, and the next three bits (rows 2–4). The second optical sensor pair 102 reads the second four bits in the eight bit word 210, i.e., the $5^{th}$ bit (row 5) through the most significant bit (row 8), indicated at 222.

The first and second optical sensor pairs 100 and 102, being spaced four bits apart, initialize the absolute position register 210, i.e. initially fill the eight bits of the absolute position register, when the first and second optical sensor pairs each read four consecutive binary bit indicators 76 in either the clockwise or counterclockwise direction. The clockwise direction is indicated generally by the arrow labeled 230 in FIG. 8. The counterclockwise direction is indicated generally by the arrow labeled 232 in FIG. 8.

The angle sensor 60 is thus initialized when the data wheel 70, i.e., the rotor 40, is rotated such that the first and second optical sensor pairs 100 and 102 each read a predetermined number of binary bit indicators 76. This corresponds to a predetermined angular distance, or initialization angle, which depends on the particular configuration of the angle sensor 60. The angle sensor 60 of the illustrated embodiment requires that the first and second optical sensor pairs 100 and 102 each read four binary bit indicators to initialize the angle sensor 60. This corresponds to a maximum initialization angle of approximately 1.40625×4 degrees, or about 5.625 degrees.

Those skilled in the art will appreciate that the initialization angle could be less depending on the initial position of the binary bit indicators 76 relative to the first and second optical sensor pairs 100 and 102. Those skilled in the art will also appreciate that the initialization angle of the angle sensor 60 is dependent on the number of optical sensor pairs reading the first data ring 72 and the resolution at which the angular position is to be sensed. The initialization angle can therefore be adjusted by increasing or decreasing the number of optical sensor pairs reading the first data ring 72 or by adjusting the bit resolution of the angle sensor 60. For example, if the first and second optical sensor pairs 100 and 102 of the angle sensor 60 of the illustrated embodiment were replaced with four optical sensor pairs spaced two bits apart, the angle sensor would be initialized when each of the optical sensor pairs reads two binary bit indicators. The maximum initialization angle would thus be 1.40625×2 degrees or 2.81250 degrees.

Once the absolute position register 214 is initialized, one bit is added to the register and one bit is removed from the register every time the data wheel rotates one bit in either the clockwise or counterclockwise direction. When the data wheel 70 rotates one bit in the clockwise direction, the bits in the absolute position register 214 shift up one significant bit, i.e., the least significant bit 220 becomes the second least significant bit, the second least significant bit becomes the third least significant bit, and so on. The most significant bit 222 is dropped from the absolute position register 214 and a new least significant bit 220 is added to the absolute position register when the data wheel 70 rotates in the clockwise direction.

When the data wheel 70 rotates one bit in the counterclockwise direction, the bits in the absolute position register 214 shift down one significant bit, i.e., the most significant bit 222 becomes the second most significant bit, the second most significant bit becomes the third most significant bit, and so on. The least significant bit 220 is dropped from the absolute position register 210 and a new most significant bit 222 is added to the absolute position register when the data wheel 70 rotates in the clockwise direction.

As an example, referring to bit #12 (positioned adjacent to the first optical sensor pair 100), the first binary bit indicator is an aperture 80. The least significant bit of the eight bit word in the absolute position register 214 represented by the interrupter 82 is thus a "1" and is indicated as such in the pseudo-random bit sequence 212 at bit #12. The other seven bits of the eight bit word of the absolute position register 214 are read along the first data ring 72 (and along the pseudo-random bit sequence 212) to the right as viewed in FIG. 8. The next seven binary bit indicators 76 of the first data ring are, in order, three interrupters 82 followed by four apertures 80. Thus, the next seven bits in the pseudo-random bit sequence 212 read "0001111". As viewed in the table 210, the bits of the eight bit word in the absolute position register 214 are arranged vertically from the least significant bit 220 (row #1) to the most significant bit 222 (row #8). Thus, the eight bit word of the absolute position register 214 represented by bit #12 reads "11110001", which has a decimal equivalent of two-hundred and forty-one (241) as illustrated in the row labeled 224 under bit #12. As indicated at 228, this corresponds to a 16.8 degree steering angle of the data wheel 70 and, thus, the steering wheel.

If the data wheel 70 rotates one bit in the clockwise direction, bit #11 becomes the least significant bit and the other seven bits of the absolute position register 214 are read along the first data ring 72 (and along the pseudo-random bit sequence 212) to the right as viewed in FIG. 8. The previous most significant bit 222 is thus dropped from the absolute position register 214. The new eight bit word in the absolute position register 214 thus reads "11100011", which has a decimal equivalent of two-hundred and twenty-seven (227). This corresponds to a 15.4 degree steering angle of the data wheel 70 and, thus, the steering wheel.

If the data wheel 70 rotates one bit in the counterclockwise direction, bit #13 becomes the least significant bit and the other seven bits of the absolute position register 214 are read along the first data ring 72 (and along the pseudo-random bit sequence 212) to the right as viewed in FIG. 8. The previous least significant bit 220 is thus dropped from the absolute position register 214. The new eight bit word in the absolute position register 214 thus reads "01111000", which has a decimal equivalent of one hundred and twenty (120). This corresponds to a 18.2 degree steering angle of the data wheel 70 and, thus, the steering wheel.

Figures 10, 11, 12:
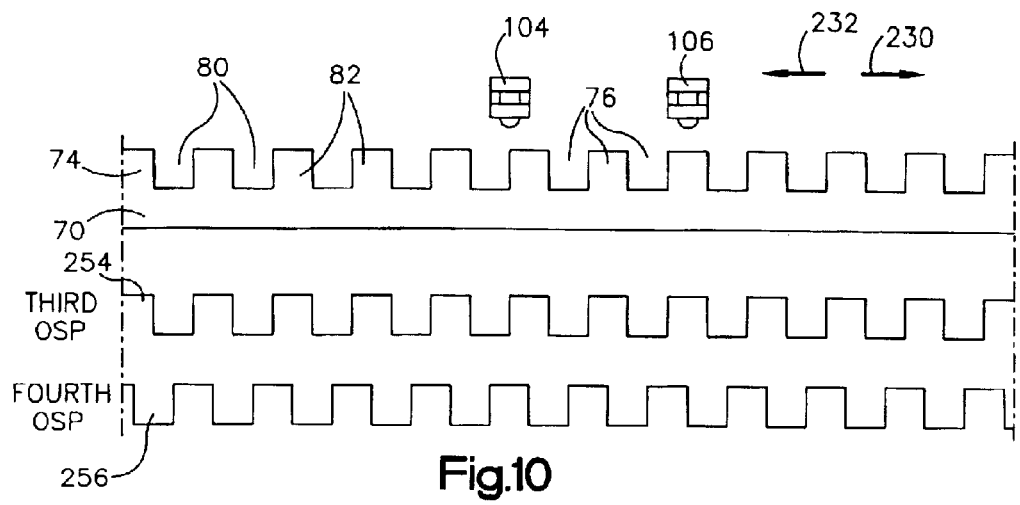
FIG. 10 is a schematic illustration depicting the operation of the angle sensor portion of the module.
FIGS. 11 and 12 are charts illustrating the operation of the angle sensor portion of the module.

A portion of the data wheel 70, including a portion of the second data ring 74, and the third and fourth optical sensor pairs 104 and 106 are illustrated in FIG. 10. As the data wheel 70 rotates the clockwise or counterclockwise direction is indicated generally by the arrows labeled 230 and 232, respectively, in FIG. 10, the third and fourth optical sensor pairs 104 and 106 read the digital bit indicators 76, i.e., the apertures 80 and interrupters 82.

The square waves 254 and 256 illustrated below the data wheel 70 in FIG. 9 illustrate the bits read by the third and fourth optical sensor pairs 104 and 106, respectively, as the data wheel rotates. Because the third and fourth optical sensor pairs 104 and 106 are arranged in quadrature, as discussed above, the square waves 254 and 256 are shifted ninety degrees. In the embodiment illustrated in FIG. 9, the square wave 254 is shifted ninety degrees ahead of the square wave 256. Those skilled in the art will recognize, however, that the relative position third optical sensor pair 104 could be shifted ninety degrees ahead of the fourth optical sensor pair 106, in which case the square wave 256 would be shifted ninety degrees ahead of the square wave 254.

The third and fourth optical sensor pairs 104 and 106 read an edge transition every time the data wheel 70 rotates a distance equal to one-half of the angular portion occupied by each of the binary bit indicators 76. The third and fourth optical sensor pairs 104 and 106 are thus switched, alternately and in succession, between the actuated and non-actuated condition every time the data wheel 70 rotates a distance equal to one-half of the angular portion occupied by each of the binary bit indicators 76. Thus, in combination, the third and fourth optical sensor pairs 104 and 106 detect rotation of the data wheel 70 with twice the resolution of either of the third and fourth optical sensor pairs alone. The resolution of the third and fourth optical sensor pairs 104 and 106 in combination is represented by the following expression:

$R_{34}=360/(256\times2)=0.703125;$ where $R_{34}$ is the resolution of the third and fourth optical sensor pairs, in degrees. Thus, the data provided by the third and fourth optical sensor pairs 104 and 106, in combination, can be used to detect rotation of the data wheel 70 in increments of 0.703125 degrees.

The microprocessor 200 includes a lookup table that correlates each of the unique eight bit words in the absolute position register 214 (FIG. 9) with the angular position of the data wheel 70 and, thus, the rotor 40 and the steering shaft 24. Using the lookup table, the microprocessor 200 correlates each of the eight bit words of the absolute position register 214 (FIG. 9) with the corresponding angular position 228. For example, bit number 11 which, as stated above, has a decimal equivalent of 227, is associated with an angular position of about 15.4 degrees.

The microprocessor 200 thus determines, via the lookup table, the absolute angular position of the data wheel 70 each time the first and second optical sensor pairs 100 and 102 provide a different eight bit word of the absolute position register 214 (FIG. 9). As stated above, the absolute position determined via the first and second optical sensor pairs 100 and 102 from the first data ring 72 has a resolution of about 1.40625 degrees.

According to the present invention, the absolute angular position of the data wheel 70 is determined to a resolution of about 0.703125 degrees by combining the data provided by the first data ring 72 via the first and second optical sensor pairs 100 and 102 with the data provided by the second data ring 74 via the third and fourth optical sensor pairs 104 and 106. This is because the third and fourth optical sensor pairs 104 and 106, arranged in quadrature, provide indication of an edge transition to the microprocessor 200 at about the midpoint between any two adjacent words of the first data ring 72.

The angle sensor 60 is thus operable to determine the angular position of the data wheel 70 and, thus, the steering wheel, to a high resolution. This determined angular position is absolute and thus does not take into account any complete revolutions made by the steering wheel. The turns counter 62 is operable to determine the number of turns made by the data wheel 70 and, thus, the steering wheel. The apparatus 10 is thus operable to determine an actual angular position of the steering wheel, including any complete revolutions made by the steering wheel, by combining the absolute angular position, sensed via the angle sensor 60, and the number of turns made by the steering wheel, sensed via the turns counter 62. In the illustrated embodiment, the actual angular position will have a resolution of about 0.703125 degrees.

In addition to the sensed angular position determined via the first and second optical sensor pairs 100 and 102 and the first data ring 72, the microprocessor 200 may also determine a calculated angular position of the rotor 40/data ring 70. Once the angle sensor 60 is initialized, an initial value for the calculated angular position is determined as being equal to the sensed angular position. As the rotor 40/data ring 70 rotates, an angular increment of 0.703125 degrees is added to or subtracted from the calculated angular position (depending on the direction of rotation) every time the third optical sensor pair 104 or fourth optical sensor pair 106 indicates an edge transition.

The angle sensor 60 thus provides redundant indication, i.e., the sensed angular position and the calculated angular position, of the data wheel 70. The calculated angular position should match the sensed angular position. The microprocessor 200 may thus perform error checking functions by determining when the calculated angular position does not match the sensed angular position.

The apparatus 10 can also determine the direction of rotation of the data wheel 70 and, thus, the steering wheel. The direction of rotation is determined based on data provided by the third and fourth optical sensor pairs 104 and 106. Because the third and fourth optical sensor pairs 104 and 106 are arranged in quadrature, the microprocessor 200 can determine the direction of rotation of the data wheel 70. The microprocessor 200, knowing the current condition of the third and fourth optical sensor pairs 104 and 106, monitors which of the third and fourth optical sensor pairs reads the next edge transition. This determines the direction of rotation of the data wheel 70. This determination will vary depending on which of the third and fourth optical sensor pairs 104 and 106 is shifted ahead of the other of the pairs.

A case in which the fourth optical sensor pair 106 is shifted 90 degrees ahead of the third optical sensor pair 104 is illustrated in the table of FIG. 11. This is also the case with the configuration illustrated in FIG. 10. The table of FIG. 11 thus illustrates the determination of the direction of rotation in the configuration illustrated in FIG. 10.

As illustrated in FIG. 11, there are four different combinations for the current position of the third and fourth optical sensor pairs 104 and 106. These are listed in the columns labeled 302 in FIG. 11. At each of the four combinations for the current position, there are two possibilities for the next combination read by the third and fourth optical sensor pairs 104 and 106. The next combination read by the third and fourth optical sensor pairs 104 and 106 determines whether the data ring 70 is rotating in a clockwise direction 230 (FIG. 10) or a counterclockwise direction 232.

The two possibilities of the next combination read are illustrated in columns labeled 304 and 306, respectively. If the next combination read by the third and fourth optical sensor pairs 104 and 106 matches the combination in the columns labeled 304, counterclockwise rotation is detected. If the next combination read by the third and fourth optical sensor pairs 104 and 106 matches the combination in the columns labeled 306, clockwise rotation is detected.

By way of example, in FIG. 10, the current position of the third and fourth optical sensor pairs 104 and 106 is that the third and fourth pairs are both reading an interrupter 82. Thus, the third and fourth optical sensor pairs 104 and 106 are both reading "0" in the current position of FIG. 10. Referring to FIG. 11, the current position of "00" is illustrated in the row labeled 308. As indicated by the table of FIG. 11, if the next combination read is a "01", i.e. the fourth optical sensor pair 106 reads a "1", then the data wheel 70 (FIG. 10) is rotating in the counterclockwise direction 232. If the next combination read is a "10", i.e. the third optical sensor pair 104 reads a "1", then the data wheel 70 (FIG. 10) is rotating in the clockwise direction 230.

A case in which the third optical sensor pair 104 is shifted 90 degrees ahead of the fourth optical sensor pair 106 is illustrated in the table of FIG. 12. In this configuration, it can be seen that, for each current position, the next combinations indicative of clockwise and counterclockwise rotation, respectively, are reversed from that of FIG. 11.

From the above description of the invention, those skilled in the art will perceive improvements, changes and modifications in the invention. For example, in the illustrated embodiment, the resolution of the angle sensor was effectively doubled by using two optical sensor pairs in quadrature to read the second data ring. Those skilled in the art will recognize that the resolution could be increased by increasing the number of optical sensor pairs reading the second data ring. For example, four optical sensor pairs spaced 45 degrees apart could quadruple the resolution. Also, the resolution could be increased by increasing the number of binary bit indicators in the first and/or second data rings. Such improvements, changes and modifications within the skill of the art are intended to be covered by the appended claims.

Having described the invention, the following is claimed:

1. Apparatus for measuring an angular position of a member that is rotatable about an axis and for counting the number of rotations of the member about the axis, said apparatus comprising:

a first data ring centered on the axis and rotatable about the axis with the member, said first data ring including binary bit indicators for indicating an absolute angular position of the member;

means for reading said binary bit indicators of said first data ring and providing a first signal indicative of said absolute angular position of the member, said first signal having a first resolution capable of detecting a first predetermined amount of change in the angular position of the member;

a second data ring centered on the axis and rotatable about the axis with the member, said second data ring including binary bit indicators for indicating incremental changes in the angular position of the member;

means for reading said binary bit indicators of said second data ring and providing a second signal indicative of said incremental changes in angular position of the member, said second signal having a second resolution capable of detecting a second predetermined amount of change in the angular position of the member, said second predetermined amount being less than said first predetermined amount; and means for receiving said first and second signals and using said first and second signals to calculate a calculated absolute angular position of the member, said calculated absolute angular position of the member having a resolution equal to said second resolution.

2. Apparatus as defined in claim 1, wherein said second predetermined amount is about half said first predetermined amount.

3. Apparatus as defined in claim 2, further comprising a first data wheel rotatable about the axis with the member, each of said binary bit indicators of said first and second data rings comprising one of an aperture extending through said first data wheel and an interrupter comprising a generally opaque portion of said first data wheel.

4. Apparatus as defined in claim 3, wherein said first data ring comprises an equal number of said apertures and said interrupters, and said second data ring comprises an equal number of said apertures and interrupters.

5. Apparatus as defined in claim 4, wherein the number of apertures in said first and second data rings and the number of interrupters in said first and second data rings is equal.

6. Apparatus as defined in claim 5, wherein said first resolution is calculated according to the following formula:

$$R_1 = 360/N_1;$$

wherein $R_1$ is said first resolution, expressed in degrees, and $N_1$ is the total number of said binary bit indicators in said first data ring.

7. Apparatus as defined in claim 6, wherein said second resolution is calculated according to the following formula:

$$R_2 = 360/2N_2;$$

wherein $R_2$ is said second resolution, expressed in degrees, and $N_2$ is the total number of said binary bit indicators in said second data ring.

8. Apparatus as defined in claim 5, wherein said first and second data rings each include 256 binary bit indicators including 128 apertures and 128 interrupters.

9. Apparatus as defined in claim 3, wherein said apertures and interrupters of said first data ring are arranged in a predetermined pattern such that each of said apertures and interrupters corresponds to a predetermined absolute angular position of the member, each of said apertures and interrupters of said first data ring being spaced equidistantly about said first data ring.

10. Apparatus as defined in claim 9, wherein said predetermined pattern comprises a pseudo-random bit sequence.

11. Apparatus as defined in claim 3, wherein said apertures and interrupters of said second data ring are arranged in an alternating pattern such that each of said apertures and interrupters corresponds to a predetermined incremental change of angular position of the member, each of said apertures and interrupters of said second data ring being spaced equidistantly about said second data ring.

12. Apparatus as defined in claim 3, wherein said means for reading said binary bit indicators in said first data ring comprises at least one optical sensor pair and said means for reading said binary bit indicators in said second data ring comprises at least one optical sensor pair, each of said optical sensor pairs comprising an optical transmitter positioned opposite an optical receiver.

13. Apparatus as defined in claim 12, wherein said data wheel rotates a given number of bits to initialize calculation of said sensed angular position, said given number of bits being determined at least partially based on the number of optical sensor pairs included in said means for reading said binary bit indicators in said first data ring.

14. Apparatus as defined in claim 12, wherein said means for reading said binary bit indicators of said first data ring comprises first and second optical sensor pairs, said first data ring passing between said optical transmitters and receivers of said first and second optical pairs as said first data wheel rotates about the axis, said apertures permitting said optical transmitters to transmit light to said optical receivers, said interrupters blocking said optical transmitters from transmitting light to said optical receivers.

15. Apparatus as defined in claim 14, wherein said means for reading said binary bit indicators of said second data ring comprises third and fourth optical sensor pairs, said second data ring passing between said optical transmitters and receivers of said third and fourth optical pairs as said first data wheel rotates about the axis, said apertures permitting said optical transmitters to transmit light to said optical receivers, said interrupters blocking said optical transmitters from transmitting light to said optical receivers.

16. Apparatus as defined in claim 15, wherein said first and second optical sensor pairs are positioned such that said first and second optical sensor pairs read centers of respective ones of said binary bit indicators of said first data ring simultaneously, said respective ones of said binary bit indicators of said first data ring being spaced four bits apart along said first data ring.

17. Apparatus as defined in claim 16, wherein said data wheel rotates four bits to initialize calculation of said sensed angular position.

18. Apparatus as defined in claim 16, wherein said third and fourth optical sensor pairs are positioned along said second data ring such that said third optical sensor pair reads an edge of one of said binary bit indicators of said second data ring when said fourth optical sensor pair reads a center of another of said binary bit indicators of said second data ring.

19. Apparatus as defined in claim 18, wherein said first and second optical sensor pairs read said centers of said binary bit indicators of said first data ring when said third optical sensor pair reads an edge of a binary bit indicator of said second data ring.

20. Apparatus as defined in claim 19, wherein said first and second optical sensor pairs are triggered to read said binary bit indicators of said first data ring when said third optical sensor pair reads an edge of a binary bit indicator of said second data ring.

21. Apparatus as defined in claim 18, wherein said means for receiving said first and second signals uses said second signal to determine the direction of rotation of the member.

22. Apparatus as defined in claim 18, wherein said third and fourth optical sensor pairs are positioned in quadrature along said second data ring.

23. Apparatus as defined in claim 3, further comprising a second data wheel and means for measuring a predetermined number of angular positions of said second data wheel, said second data wheel being rotated to given ones of said angular positions for every complete rotation of the member, said means for measuring said angular positions providing a signal indicative of the number of complete rotations of the member.

24. Apparatus as defined in claim 23, wherein said second data wheel is rotatable to said angular positions by said first data wheel.

25. Apparatus as defined in claim 24, wherein said means for measuring said angular positions of said second data wheel comprises at least one optical sensor pair, each of said at least one optical sensor pair having an optical transmitter positioned opposite an optical receiver, said second data wheel including at least one aperture and at least one interrupter movable with said second data wheel along a path extending between said optical transmitters and receivers, said at least one aperture permitting said transmitters to transmit light to said receivers, said at least one interrupter blocking said transmitters from transmitting light to said receivers, said at least one aperture and said at least one interrupter being arranged in a predetermined pattern such that different combinations of said transmitters are permitted to transmit light to said receivers, said combinations corresponding the number of complete revolutions of said first data wheel, said optical sensor pairs generating a third signal indicative of the number of complete revolutions of said first data wheel.

26. Apparatus as defined in claim 25, wherein said means for receiving said first and second signals also receives said third signal.

27. Apparatus as defined in claim 25, wherein said means for measuring said angular positions of said second data wheel comprises three optical sensor pairs for measuring three complete rotations of said member.

28. Apparatus as defined in claim 1, wherein said first and second data rings are concentric.

29. Apparatus as defined in claim 1, wherein said member is one of a vehicle steering wheel and a steering shaft.

30. An apparatus for detecting the steering angle of a vehicle steering wheel that is rotatable about an axis, said apparatus comprising:
a first data wheel rotatable with the steering wheel about the axis, said first data wheel comprising:
a first code ring centered on the axis and rotatable with said first data wheel about the axis, said first code ring comprising a predetermined number of apertures and a predetermined number of interrupters positioned in a predetermined annular pattern, each of said apertures and interrupters being equal in size and occupying an equal angular portion of said first code ring, each of said apertures and interrupters corresponding to an absolute angular position of said first data wheel; and
a second code ring centered on the axis and rotatable with said first data wheel about the axis, said second code ring comprising a predetermined number of apertures and a predetermined number of interrupters positioned in an alternating annular pattern, each of said apertures and interrupters being equal in size and occupying an equal angular portion of said second code ring, each of said apertures and interrupters corresponding to an incremental change in the angular position of said first data wheel;
a first pair of optical sensors for reading said first code ring and providing a first binary signal indicative of the absolute angular position of said first data wheel;
a second pair of optical sensors for reading said second code ring and providing a second binary signal indicative of the incremental change in the angular position of said first data wheel, said second pair of optical sensors being arranged to read said second code ring in quadrature; and
means for receiving said first and second binary signals and combining said first and second signals to provide a sensed angular position of said first data wheel, said sensed angular position having a resolution equal to half of said angular portion of said first code ring occupied by each of said apertures and interrupters.

31. Apparatus as defined in claim 30, wherein said predetermined numbers of apertures in said first and second code rings and said predetermined numbers of interrupters in said first and second code rings are equal.

32. Apparatus as defined in claim 30, further comprising a second data wheel and means for measuring a predetermined number of angular positions of said second data wheel, said second data wheel being rotated to given ones of said angular positions for every complete rotation of said first data wheel, said means for measuring said angular positions providing a signal indicative of the number of complete rotations of said first data wheel.

33. An apparatus for detecting the steering angle of a vehicle steering wheel that is rotatable about an axis, said apparatus comprising:
a first data wheel rotatable about the axis, said first data wheel comprising:
a first code ring rotatable with said first data wheel about said axis, said first code ring comprising a predetermined number of absolute bit indicators positioned in a predetermined annular pattern about the axis, each of said absolute bit indicators having a width occupying an equal angular portion of said first code ring, each of said absolute bit indicators corresponding to an absolute angular position of said first data wheel; and
a second code ring rotatable with said first data wheel about the axis, said second code ring comprising a predetermined number of incremental bit indicators positioned in an alternating annular pattern about the axis, each of said incremental bits having a width occupying an equal angular portion of said second code ring, each of said incremental bits corresponding to an incremental change in the angular position of said first data wheel;

means for reading said first code ring and providing a first binary signal indicative of the absolute angular position of said first data wheel;

means for reading said second code ring and providing a second binary signal indicative of the incremental change in the angular position of said first data wheel, said means for reading said second code ring being adapted to read said incremental bit indicators in quadrature; and means for receiving said first and second binary signals and combining said first and second signals to provide a sensed angular position of said first data wheel, said sensed angular position having a resolution equal to half of said angular portion of said first code ring occupied by each of said absolute bit indicators.

34. Apparatus as defined in claim 33, further comprising a second data wheel and means for measuring a predetermined number of angular positions of said second data wheel, said second data wheel being rotated to given ones of said angular positions for every complete rotation of said first data wheel, said means for measuring said angular positions providing a signal indicative of the number of complete rotations of said first data wheel.

35. Apparatus for detecting the angular position of a member that is rotatable about an axis, said apparatus comprising:

a first data wheel rotatable with said member about the axis;

a first data ring comprising a predetermined number of binary bit indicators arranged on said first data wheel in an annular ring about the axis, said binary bit indicators of said first data ring being arranged in a predetermined pattern such that each of said binary bit indicators corresponds to a predetermined absolute angular position of said first data wheel, each of said absolute angular positions being spaced equidistantly about said first data ring;

a second data ring comprising a predetermined number of binary bit indicators, equal to said predetermined number of binary bit indicators of said first data ring, said binary bit indicators of said second data ring being arranged on said first data wheel in an annular ring about the axis, said binary bit indicators of said second data ring being arranged in an alternating pattern such that each of said second binary bit indicators corresponds to a predetermined incremental change of angular position of said first data wheel, said incremental change having a magnitude equal to the difference between adjacent ones of said absolute angular positions indicated by said binary bit indicators of said first data ring;

means for reading said binary bit indicators of said first data ring and providing a first signal indicative of the absolute angular position of said first data wheel;

means for reading said binary bit indicators of said second data ring and providing a second signal indicative of the incremental angular position of said first data wheel, said means for reading said binary bit indicators of said second data ring being adapted to read said binary bit indicators in quadrature; and means for receiving said first and second signals and providing a sensed angular position of said first data wheel, said sensed angular position having a resolution equal to half of the difference between adjacent ones of said absolute angular positions indicated by said binary bit indicators of said first data ring.

36. Apparatus as defined in claim 35, further comprising a second data wheel and means for measuring a predetermined number of angular positions of said second data wheel, said second data wheel being rotated to given ones of said angular positions for every complete rotation of said first data wheel, said means for measuring said angular positions providing a signal indicative of the number of complete rotations of said first data wheel.

37. Apparatus for detecting the angular position and number of complete revolutions of a member that is rotatable about an axis, said apparatus comprising:

first and second data rings that are rotatable with said member;

means for reading said first data ring and providing a first binary signal indicative of an absolute angular position of said member;

means for reading said second data ring and providing a second binary signal indicative of an incremental change in the angular position of said member;

means for counting the number of complete revolutions of the member and providing a third binary signal indicative of the number of complete turns of the member; and means for receiving said first, second, and third signals and providing a sensed angular position of said member based on said first and second signals.

38. Apparatus for detecting the angular position of a member that is rotatable about an axis, said apparatus comprising:

first and second data rings that are rotatable with said member;

means for reading said first data ring and providing a first signal indicative of an absolute angular position of said member;

means for reading said second data ring and providing a second signal indicative of an incremental change in the angular position of said member; and means for receiving said first and second signals and calculating a sensed angular position of said member based on said first and second signals, said means for receiving said first and second signals determining the direction of rotation of the member based on said second signal.

39. Apparatus for detecting the angular position of a member that is rotatable about an axis, said apparatus comprising:

first and second data rings rotatable with said member;

means for reading said first data ring and providing a first binary signal indicative of an angular position of said member, said first binary signal having a 256 bit resolution;

means for reading said second data ring and providing a second binary signal indicative of an angular position of said member, said second binary signal having a 256 bit resolution; and means for receiving said first and second binary signals and calculating a sensed angular position of said member based on said first and second binary signals, said sensed angular position having a 512 bit resolution.

* * * * *